United States Patent
Kirinuki et al.

(10) Patent No.: US 11,960,390 B2
(45) Date of Patent: Apr. 16, 2024

(54) TEST APPARATUS, TEST METHOD AND PROGRAM

(71) Applicant: NIPPON TELEGRAPH AND TELEPHONE CORPORATION, Tokyo (JP)

(72) Inventors: Hiroyuki Kirinuki, Tokyo (JP); Haruto Tanno, Tokyo (JP); Toshiyuki Kurabayashi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 119 days.

(21) Appl. No.: 17/610,636

(22) PCT Filed: May 13, 2019

(86) PCT No.: PCT/JP2019/018969
§ 371 (c)(1),
(2) Date: Nov. 11, 2021

(87) PCT Pub. No.: WO2020/230241
PCT Pub. Date: Nov. 19, 2020

(65) Prior Publication Data
US 2022/0206934 A1    Jun. 30, 2022

(51) Int. Cl.
*G06F 11/36* (2006.01)

(52) U.S. Cl.
CPC ...... *G06F 11/3688* (2013.01); *G06F 11/3696* (2013.01)

(58) Field of Classification Search
CPC .................. G06F 11/3696; G06F 11/3688
See application file for complete search history.

(56) References Cited

U.S. PATENT DOCUMENTS

| | | | |
|---|---|---|---|
| 2007/0043980 A1* | 2/2007 | Ohashi | G06F 11/3684 714/45 |
| 2009/0129739 A1* | 5/2009 | Kato | G06T 11/60 386/282 |
| 2009/0183141 A1* | 7/2009 | Tai | G06F 11/3604 717/124 |
| 2018/0165258 A1* | 6/2018 | Scoda | G06F 11/3688 |
| 2021/0397546 A1* | 12/2021 | Cser | G06F 11/3688 |
| 2022/0206931 A1* | 6/2022 | Hwang | G06F 11/3692 |

OTHER PUBLICATIONS

Pfahl et al. (2014) "How is exploratory testing used? A state-of-the-practice survey" ESEM '14 Proceedings of the 8thACM/IEEE International Symposium on Empirical Software Engineering and Measurement Article No. 5, Sep. 18, 2014 [online] website: https://dl.acm.org/citation.cfm?doid=2652524.2652531.

* cited by examiner

*Primary Examiner* — Wei Y Zhen
*Assistant Examiner* — Brahim Bourzik

(57) ABSTRACT

A testing device includes: a first update unit that updates a screen transition diagram that is displayed on a display device and shows a transition of a screen state according to input of an operation on a screen relating to a program to be tested; and a second update unit that divides or integrates a node according to an operation of the node for each screen or each screen state in the screen transition diagram. Thus, the testing device makes it possible to obtain the advantage of exploratory testing while reducing a man-hour to perform the exploratory testing.

9 Claims, 6 Drawing Sheets

TEST APPARATUS, TEST METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/018969, filed on 13 May 2019, the disclosure of which is hereby incorporated herein by reference in its entirety.

TECHNICAL FIELD

The present invention relates to a testing device, a testing method, and a program.

BACKGROUND ART

There is script testing as the most typical testing method. The script testing is a method in which a testing design is first performed and then testing is performed along a testing procedure after the determination of the testing procedure.

On the other hand, exploratory testing is a method in which a testing content to be next performed is considered while testing is performed. In the exploratory testing, a testing content is determined on a case-by-case basis with attention paid to the last testing result or the behavior of software during testing, whereby a spot in which a system problem possibly hides is intensively tested. Since there is no need to generate a testing design book in the exploratory testing, advance preparations for the testing are reduced, and a system problem can be efficiently found. The exploratory testing requires certain skills in a person in charge of the testing but is excellent in that a system problem can be found without relying on a design book or a specification form even when development is made under unconfirmed specifications.

CITATION LIST

Non Patent Literature

[NPL 1] "How is exploratory testing used? A state-of-the-practice survey," ESEM '14 Proceedings of the 8th ACM/IEEE International Symposium on Empirical Software Engineering and Measurement Article No. 5, [online] Internet <URL:https://dl.acm.org/citation.cfm?doid=2652524.2652531>

SUMMARY OF THE INVENTION

Technical Problem

However, as a problem residing in the exploratory testing, it is difficult to confirm what type of idea was used and what type of testing was performed after the testing due to the nonexistence of a testing design book, and the exploratory testing is poor in auditability. Therefore, in a project in which auditability is generally important, the script testing is used in combination since testing cannot be completed only by the exploratory testing. Further, many operations are required to perform substantial documentation even if existing tools are used, and the advantage of the exploratory testing by which a system problem can be efficiently found is reduced.

The present invention has been made in view of the above point and has an object of making it possible to obtain the advantage of exploratory testing while reducing a man-hour to perform the exploratory testing.

Means for Solving the Problem

Accordingly, in order to solve the above problem, a testing device includes: a first update unit that updates a screen transition diagram that is displayed on a display device and shows a transition of a screen state according to input of an operation on a screen relating to a program to be tested; and a second update unit that divides or integrates a node according to an operation of the node for each screen or each screen state in the screen transition diagram.

Effects of the Invention

It is possible to obtain the advantage of exploratory testing while reducing a man-hour to perform the exploratory testing.

DESCRIPTION OF EMBODIMENTS

Figure 1:
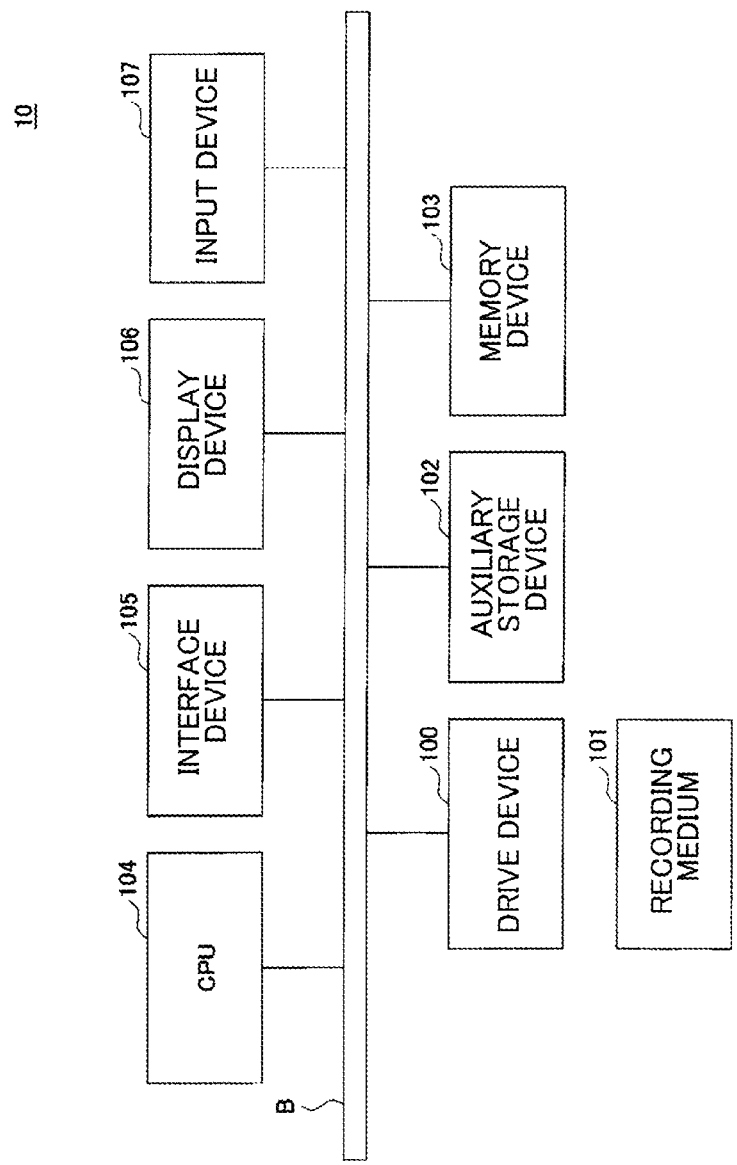
FIG. 1 is a diagram showing a hardware configuration example of a testing device 10 according to an embodiment of the present invention.

Hereinafter, an embodiment of the present invention will be described on the basis of the drawings. FIG. 1 is a diagram showing a hardware configuration example of a testing device 10 according to the embodiment of the present invention. The testing device 10 of FIG. 1 has a drive device 100, an auxiliary storage device 102, a memory device 103, a CPU 104, an interface device 105, a display device 106, an input device 107, and the like, all of which are connected to one another via a bus B.

A program that realizes processing in the testing device 10 is provided by a recording medium 101 such as a CD-ROM. When the recording medium 101 storing the program is set in the drive device 100, the program is installed in the auxiliary storage device 102 via the drive device 100 from the recording medium 101. However, the program is not necessarily installed from the recording medium 101 and may be downloaded from other computers via a network. The auxiliary storage device 102 stores necessary files, data, or the like, besides the installed program.

Upon receiving instructions to activate the program, the memory device 103 reads the program from the auxiliary storage device 102 and stores the same. The CPU 104 realizes a function relating to the testing device 10 according to the program stored in the memory device 103. The interface device 105 is used as an interface for connection with a network. The display device 106 displays a GUI (Graphical User Interface) or the like based on the program. The input device 107 is constituted by a keyboard, a mouse, or the like and used to input various operation instructions.

Note that a PC (Personal Computer), a mobile terminal, or the like may be used as the testing device 10.

Figure 2:
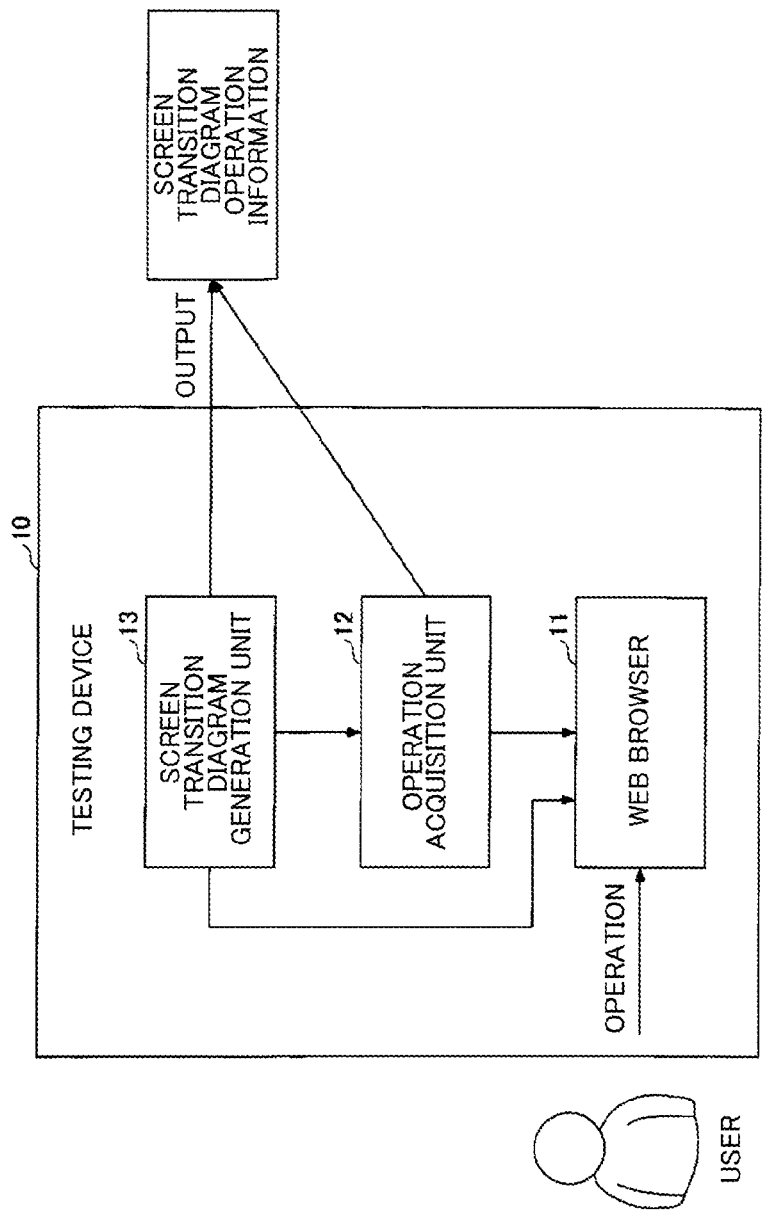
FIG. 2 is a diagram showing a function configuration example of the testing device 10 according to the embodiment of the present invention.

FIG. 2 is a diagram showing a function configuration example of the testing device 10 according to the embodiment of the present invention. In FIG. 2, the testing device 10 has a Web browser 11, an operation acquisition unit 12, a screen transition diagram generation unit 13, and the like. The respective units are realized by processing that one or more programs installed in the testing device 10 cause the CPU 104 to perform.

The Web browser 11 is a general-purpose Web browser 11 that displays the screen of a program to be tested (Web application) in exploratory testing.

The operation acquisition unit 12 embeds a source code (such as a script) to detect operations on screens in respective HTML elements in the HTML of the respective screens of a Web application to be tested. When detecting a click, input, or the like on the basis of the source code, the operation acquisition unit 12 acquires the following information (the following information items (1) to (4) are collectively called "operation information") from the Web browser 11.

(1) Information on an operation type such as a click, a double click, and input
(2) Information on an operated HTML element (an HTML attribute such as id, name, and xpath)
(3) Input value
(4) Screenshot immediately after operation
(5) Operation timestamp The operation acquisition unit 12 records the operation information for each operation. Since information as to which HTML element has been operated is recorded, a user can confirm an HTML element that has been operated.

Like the operation acquisition unit 12, the screen transition diagram generation unit 13 embeds a source code to monitor a screen transition in HTML. When detecting a screen transition on the basis of the source code, the screen transition diagram generation unit 13 updates a screen transition diagram in which screens are regarded as nodes and transitions are regarded as edges. Note that the screen transition diagram is displayed on the display device 106. Accordingly, the screen transition diagram is updated every time a screen transition occurs with a user's operation on a screen (Web application screen) that is being displayed.

In a screen transition diagram, a node is made distinguishable as the state of an image (hereinafter called an "screen state") changes with not only a difference in URL (that is, not only a screen transition based on an HTTP request) but also the execution of a script or the like. That is, a node is generated for each screen state. This is because there is a case that even a screen having the same URL and the same title is desirably regarded as a different screen in testing depending on a Web application. Accordingly, a "screen" in the present embodiment is not determined by a URL or a title but is defined as an aggregate of one or more screen states. It is determined that a screen state is matched only when HTML that is being drawn (the content of a screen that is being drawn) is completely matched. Otherwise, a different screen state is determined. The user can freely determine which screen states are put together to generate one screen. The user can operate a screen transition diagram displayed by the screen transition diagram generation unit 13 to divide a screen into pieces (make one screen state inside the screen independent as another screen).

Figure 3:
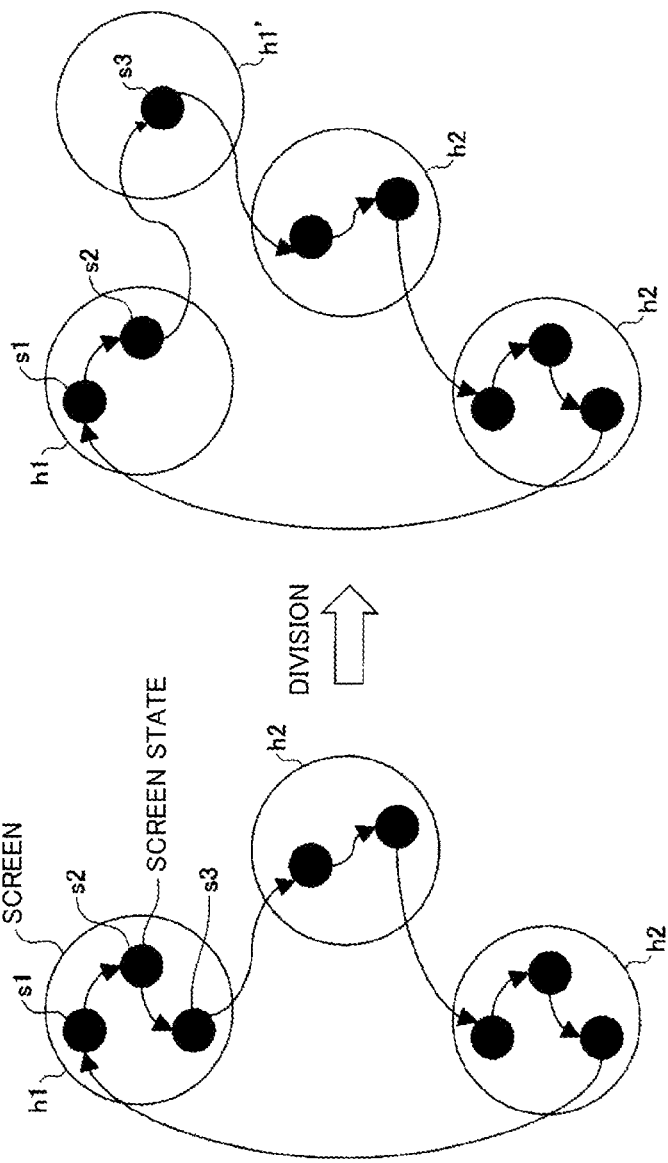
FIG. 3 is a diagram showing an example of screen division in a screen transition diagram.

FIG. 3 is a diagram showing an example of screen division in a screen transition diagram. The left side of FIG. 3 shows the screen transition diagram before division. In the screen transition diagram, solid-white circles are nodes showing screens (hereinafter called "screen nodes"), and black-painted circles inside the screen nodes are nodes showing screen states (hereinafter called "screen state nodes"). The arrowheads between the nodes show transition directions between the nodes.

In FIG. 3, the screen transition diagram on the left side shows a transition from a screen h1 to a screen h2, a transition from the screen h2 to a screen h3, and a transition from the screen h3 to the screen h1. Further, it is shown that the screen h1 has the three screen states of a screen state s1, a screen state s2, and a screen state s3. When the screen state s3 among these screen states is divided from the screen h1, the screen transition diagram is brought into a state on the right side of FIG. 3. In the screen transition diagram on the right side of FIG. 3, the screen state s3 is a screen state inside a screen h1'.

Note that screen states having the same URLs are included in the same screen nodes by default. When the user performs an operation to divide a screen in a screen transition diagram, a screen state is added to the screen transition diagram as a screen (node) different from the screen if the screen state relating to the same URL as that of the screen occurs later in a Web application to be tested. Accordingly, since the screen h1 is divided in the example of FIG. 3, respective screen states that will occur later in the screen h1 are automatically added to the screen transition diagram as the screen state nodes of a separate screen node.

In such a case, there is a possibility that Single Page Application or the like has only one URL. Therefore, once a screen is divided, all screen states after that are recognized as separate screens, whereby the number of nodes in the screen transition diagram becomes excessive.

In view of this, the user can integrate a plurality of screen states into one screen node in a screen transition diagram in the present embodiment.

Figure 4:
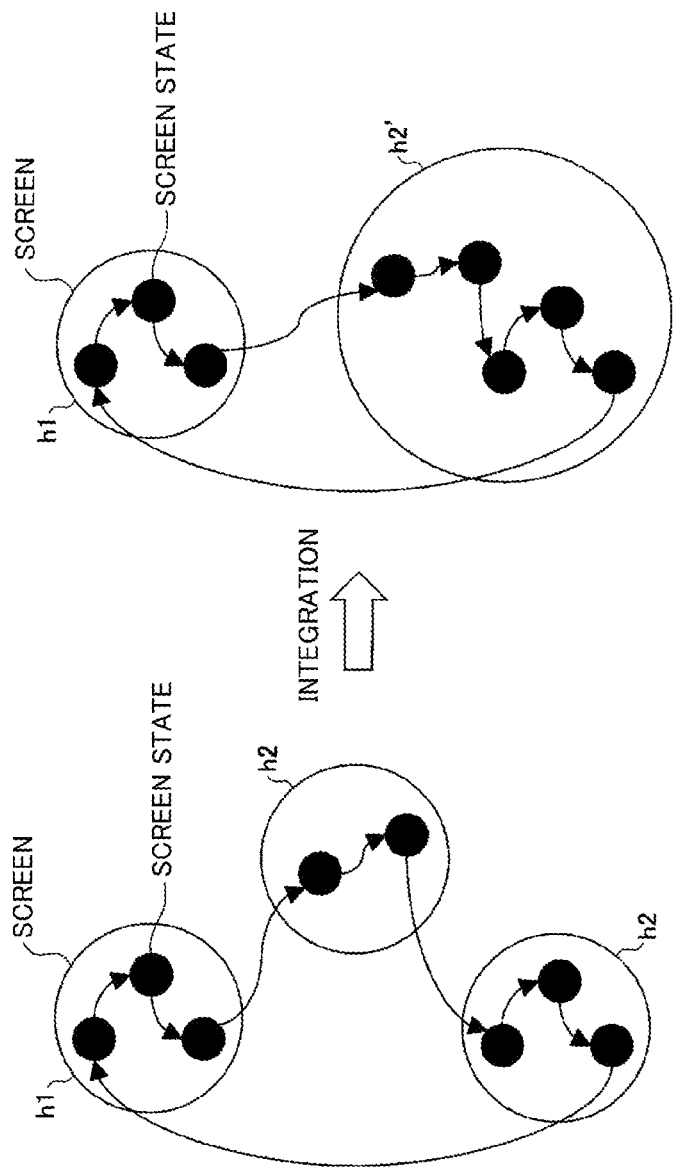
FIG. 4 is a diagram showing an example of the integration of screen states in the screen transition diagram.

FIG. 4 is a diagram showing an example of the integration of screen states in a screen transition diagram. The left side of FIG. 4 shows the screen transition diagram before integration, and the right side thereof shows the screen transition diagram after the integration. In FIG. 4, the respective screen states of a screen h2 and the respective screen states of a screen h3 are integrated into a screen h2'.

However, it is troublesome to perform an integration operation every time a new screen state occurs in a screen that has been once divided as described above. Therefore, the screen transition diagram generation unit 13 records definition information (hereinafter called a "screen definition") showing how the user has performed integration and automatically adds subsequent screen nodes or the like on the basis of the screen definition.

Note that the operation acquisition unit 12 and the screen transition diagram generation unit 13 may be mounted as the expanded functions of the Web browser 11. For example, the operation acquisition unit 12 and the screen transition diagram generation unit 13 may be realized in such a manner that a script (such as JavaScript (registered trademark)) causing the testing device 10 to function as the operation acquisition unit 12 and the screen transition diagram generation unit 13 is inserted into the HTML of a Web application to be tested (for example, a native application+Webview, Electron+Webview, or the like).

Figure 5:
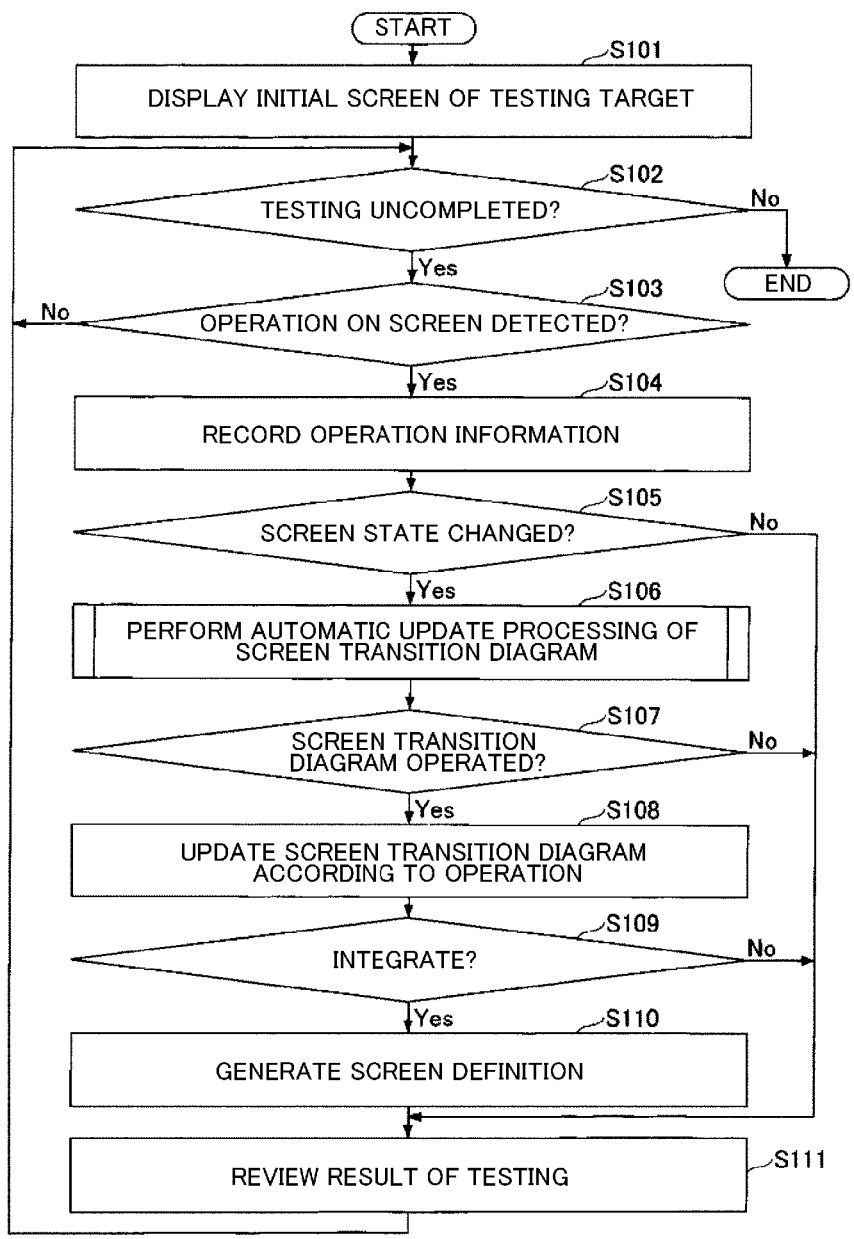
FIG. 5 is a diagram for illustrating an example of a processing procedure performed by the testing device 10.

Hereinafter, a processing procedure performed by the testing device 10 will be described. FIG. 5 is a diagram for illustrating an example of the processing procedure performed by the testing device 10.

For example, when the URL of the initial screen of a Web application to be tested in exploratory testing is input to the Web browser 11 by a user, the Web browser 11 accesses the URL to acquire the HTML or the like of the initial screen and displays the initial screen on the basis of the HTML or the like (S101). Hereinafter, a screen to be displayed in the Web browser 11 will be called a "target screen".

Subsequently, processing after step S103 is performed until instructions to the end of testing are input by the user (Yes in S102).

When detecting the input of a user's operation on the target screen (Yes in S103), the operation acquisition unit 12 acquires operation information (the above information (1) to (4)) on the operation from the Web browser 11 after the Web browser 11 performs processing corresponding to the operation and records the acquired information on, for example, the auxiliary storage device 102 (S104). However, the operation acquisition unit 12 may display the operation information on the display device 106. If operation information on a previous operation has been displayed, new operation information may be displayed in succession to the previous information.

Subsequently, the screen transition diagram generation unit 13 determines whether a screen state has changed (S105). The change of the screen state also includes the transition of a screen. That is, the change of the screen state also includes the download of the HTML of a new screen in the Web browser 11 according to an operation.

When the screen state has changed (Yes in S105), the screen transition diagram generation unit 13 performs the automatic update processing of a screen transition diagram (S106). The details of step S106 will be described in detail later.

Subsequently, when an operation to divide a screen or integrate screen states is performed by the user with respect to the screen transition diagram displayed on the display device 106 (Yes in S107), the screen transition diagram generation unit 13 updates the screen transition diagram according to the operation (S108). That is, in the case of the division, the screen transition diagram generation unit 13 adds a screen node including a screen state that is regarded as a divided target to the screen transition diagram and moves a screen state node corresponding to the screen state into the screen node as shown in FIG. 3. Further, in the case of the integration of screen states, the screen transition diagram generation unit 13 integrates a plurality of screen state nodes that are regarded as integrated targets into one screen node as shown in FIG. 4.

Note that an operation method for performing division, integration, or the like is not limited to a prescribed one. For example, in the case of the division of a screen, a prescribed operation may only be performed in a state in which a screen state to be divided is selected. Further, in the case of the integration of screen states, a prescribed operation may only be performed in a state in which screen states to be integrated with each other are selected.

When the operation performed with respect to the screen transition diagram is the integration (Yes in S109), the screen transition diagram generation unit 13 generates a screen definition relating to the integration (S110). Here, a method for generating a screen definition will be described. In the following description, A, B, C, and D show elements (hereinafter called "HTML elements") surrounded by HTML tags. Specifically, A, B, C, and D correspond to description contents (definition contents) based on HTML supporting the respective HTML elements.

It is assumed that the arrangement of HTML elements in a certain screen state s is [A, B, C] and the arrangement of HTML elements in another screen state s' is [A, B, D]. Here, it is assumed that the user integrates s with s' to define a screen h (s, s'∈S). At this time, the screen transition diagram generation unit 13 generates a screen definition [A, B, ?] (where ? is one arbitrary HTML element) as a representation of S. After that, when a screen state satisfying [A, B, ?] (that is, a screen state including all of A and B) newly occurs, the screen state is automatically added as an element of S (a screen state node included in the screen node of the screen h). Similarly, it is assumed that the user integrates s=[A, B, C] with s'=[A, B, C, D] to define a screen h. At this time, the screen transition diagram generation unit 13 generates a screen definition [A, B, C, *] (where * is an arbitrary HTML element of zero or more) as a representation of the screen h. That is, the screen transition diagram generation unit 13 generates as a screen definition a content in which portions common to integrated screen states are expressed by specific HTML elements and a different portion is expressed by a symbol (wildcard) showing an arbitrary HTML element.

Note that the HTML here is expressed by [A, B, C] or the like for simplicity. However, the HTML elements actually have a nested structure, and equivalent processing is performed on respective nests. For example, the screen definition of a screen in which [[A1, A2], B, [C1, C2]] is integrated with [[A1, A3], B, [D1, D2]] is [[A1, ?], B, ?].

When a plurality of screen states are integrated with each other by a user's operation as described above, a screen definition is generated so as to allow for the differences between the HTML of the screen states. After that, when a screen state applicable to the screen definition occurs, the screen state is automatically classified into a screen relating the screen definition.

In the case of No in step S105, in the case of No in S107, in the case of No in S109, or in succession to step S111, the user reviews the result of the testing (S111). For example, the user can confirm HTML elements that have been operated by referring to the operation information. Further, the user can confirm the contents of respective screens by a screenshot. Further, the user can confirm screens, screen states, or the like that have transitioned according to the testing by referring to the screen transition diagram.

When continuously performing the testing, the user inputs an operation to a target screen. As a result, the processing after step S104 is repeatedly performed. When the user inputs an operation showing instructions to end the testing (No in S102), the processing procedure (that is, the testing) of FIG. 5 ends.

Figure 6:
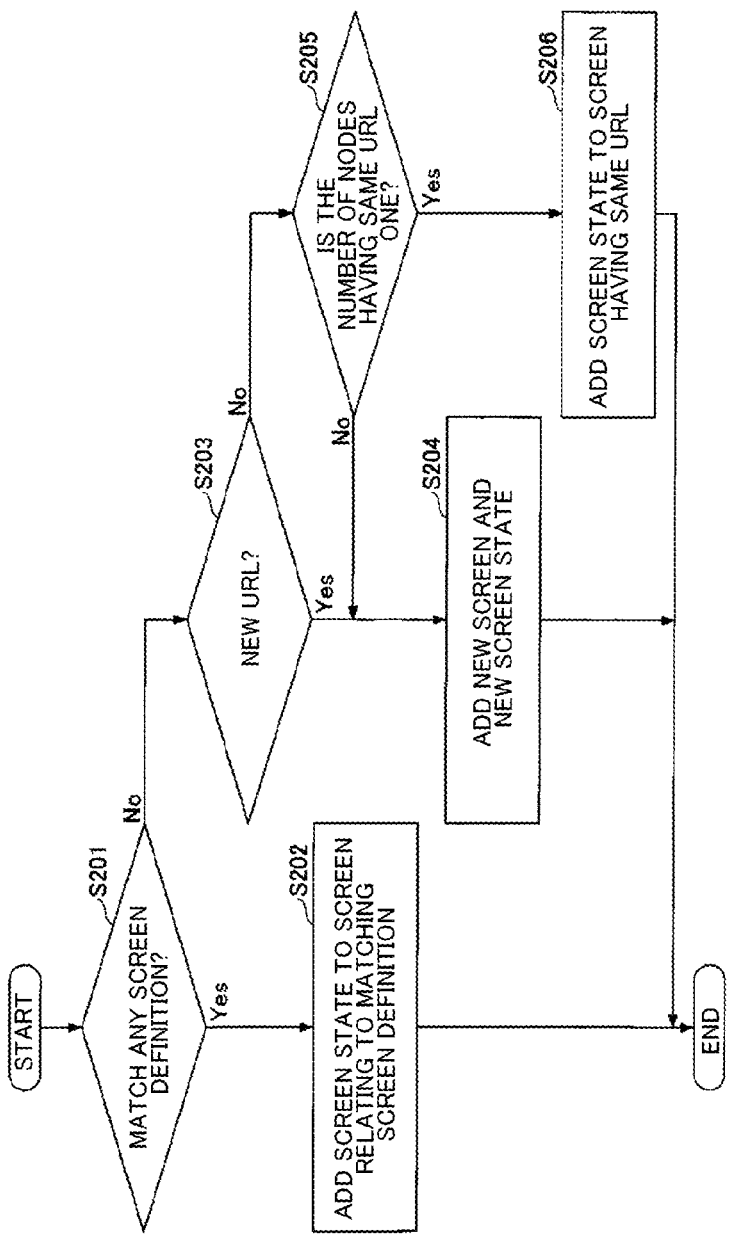
FIG. 6 is a flowchart for illustrating an example of the processing procedure of the automatic update processing of the screen transition diagram.

Subsequently, the details of step S106 will be described. FIG. 6 is a flowchart for illustrating an example of the processing procedure of the automatic update processing of a screen transition diagram. Note that a target screen in FIG. 6 is an initial screen or the screen of a recursive transition destination from the initial screen.

In step S201, the screen transition diagram generation unit 13 determines whether the HTML (hereinafter called "target HTML") after the change of the screen state of the target screen matches any screen definition. That is, the screen transition diagram generation unit 13 determines for each screen definition whether the target HTML includes all the common portions of a screen definition and a portion different from the common portions in the target HTML matches the wildcard of the screen definition.

When the target HTML matches any screen definition (Yes in S201), the screen transition diagram generation unit 13 adds a screen state node relating to the target HTML to a screen node corresponding to the screen definition in a screen transition diagram (S202).

Note that when the target HTML matches a plurality of screen definitions, the screen transition diagram generation unit 13 puts high priority on a smaller screen definition under the assumption that the screen definitions are a partially-ordered set based on an inclusive relation. This is because a smaller screen definition is more specific and increases the possibility of an appropriate classification. For example, when a screen h=[A, ?] and a screen h'=[A, [B, ?]] exist and the screen state s of the target HTM is [A, [B, C]], s is applicable to both S and S'. However, since S ⊃ S' is established, s is allocated to S'.

When one or more screen definitions do not exist or when the target HTML does not match any screen definition (No in S201), the screen transition diagram generation unit 13 determines whether the URL of the target screen is a new URL (S203). For example, the respective screen nodes of the screen transition diagram are associated with the URLs of screens relating to the screen nodes, and the URLs are stored in the memory device 103 or the like. Accordingly, the screen transition diagram generation unit 13 can determine whether the URL of the target screen is a new URL by comparing the URL of the target screen with the URLs of the respective screen nodes of the screen transition diagram.

When the URL of the target screen is the new URL (Yes in S203), the screen transition diagram generation unit 13 adds a screen node corresponding to the target screen to the screen transition diagram and adds a screen state corresponding to the target HTML to the screen node (S204). Note that when the processing procedure of FIG. 6 is performed for the first time in a case in which the initial screen is the target screen, the screen transition diagram including the first screen node and the first screen state node is displayed in step S204.

When the URL of the target screen is an existing URL (when the URL of the target screen matches the URL of any existing screen node) (No in S203), the screen transition diagram generation unit 13 determines whether the number of screen nodes having the same URL as that of the target screen is one in the screen transition diagram (S205). This determination corresponds to a determination as to whether the target screen has been divided. That is, in FIG. 3, the URL of the screen h1 and the URL of the screen h1' are common to each other. This is because the transition from the screen h1 to the screen h1' is not made due to a screen transition but is made due to the change of a screen state. Accordingly, when the number of the screen nodes having the same URL as that of the target screen is two or more, it is determined that the target screen has been divided. Otherwise, it is determined that target screen has not been divided.

When the number of the screen nodes having the same URL as the target screen is one (Yes in S205), the screen transition diagram generation unit 13 adds a screen state node corresponding to the target HTML to the screen node (S206). On the other hand, when the number of the screen nodes having the same URL as that of the target screen is two or more (No in S206), the screen transition diagram generation unit 13 performs step S204.

Note that the testing device 10 may support the review of testing as follows on the basis of the record (history) of operation information or a screen transition diagram. As a result, the user can focus on a desired portion and increase the efficiency of the review.

When any operation information is selected from among the history of operation information, a screen node on which an operation relating to the operation information has been performed among screen nodes in the screen transition diagram is highlighted.

According to the selection of the screen node from the screen transition diagram, a list of information on operations that have been performed on a screen relating the screen node is displayed.

When an edge is selected from the screen transition diagram, operation information relating to a series of operations up to a transition that has been performed on a screen before the transition is displayed.

Note that the above processing may be performed in step S111.

As described above, a screen transition diagram is automatically updated by an operation on a screen relating to a Web application to be tested according to the present embodiment. That is, the model (screen transition) of the Web application is automatically restored. Further, a user (tester) can divide a screen node or integrate a plurality of screen state nodes with each other in a screen transition diagram.

Thus, when performing exploratory testing, the user can reproduce a screen transition diagram in which screens in a desired unit are nodes and secure the same auditability as that of script testing on the basis of the screen transition diagram. Accordingly, a man-hour to create a testing design book can be reduced, and the advantage of the exploratory testing by which a problem is efficiently found can be obtained.

Further, the above effect can be further increased when operation information is recorded according to a user's operation.

Note that when finding a bug during testing, a tester may only report or make a comment on the bug, if necessary, according to conventional exploratory testing.

Note that the present embodiment may be applied to program testing other than a Web application.

Note that in the present embodiment, the screen transition diagram generation unit 13 is an example of a first update unit and a second update unit. The screen node is an example of a first node. The screen state node is an example of a second node.

The embodiment of the present invention is described in detail above. However, the present invention is not limited to such a specific embodiment, and various modifications/changes are possible within the scope of the present invention described in claims.

REFERENCE SIGNS LIST

10 Testing device
11 Web browser
12 Operation acquisition unit
13 Screen transition diagram generation unit
100 Drive device
101 Recording medium
102 Auxiliary storage device
103 Memory device
104 CPU
105 Interface device
106 Display device
107 Input device
B Bus

The invention claimed is:

1. A testing device comprising a processor configured to execute operations comprising:

displaying a screen transition diagram, wherein the screen transition diagram includes a screen node and a screen state node, the screen node includes the screen state node, the screen node corresponds to a screen associated with a program being tested according to exploratory testing, the screen state node corresponds to a screen state of the screen in the program being tested according to exploratory testing, wherein the exploratory testing includes determining a testing content while operating the program being tested;

receiving data associated with a screen transition of the program being tested, wherein the screen transition indicates a transition of the screen state of the screen associated with n the program being tested to another screen state of the screen associated with the program, and the screen transition is caused by an interactive input to the screen associated with the program being tested;

automatically updating, based on the data associated with the screen transition, the screen state node in the screen transition diagrams;

interactively receiving an operation associated with modifying the screen state node in the screen transition diagram, wherein the operation includes modifying a first association between the screen state and the screen to a second association between the screen state and another screen; and modifying the screen state node in the screen transition diagram by modifying association between the screen state node and the screen node to another association between the screen state node to another screen node according to the operation in the screen transition diagram.

2. The testing device according to claim 1, wherein the automatically updating the screen state node further comprises:

adding a first screen state node corresponding to a screen of a transition destination to the screen transition diagram when a screen to be displayed transitions; and generating a second screen state node corresponding to a state after a change of the screen inside the first screen state node when the screen state of the screen changes according to the input of the operation.

3. The testing device according to claim 2, wherein the modifying the screen state node further comprises generating information showing portions common to screen states relating to a plurality of the second screen state nodes when the plurality of the second screen state nodes relating to the screen states are integrated into the first screen state node and wherein the automatically updating the screen state node further comprises adding the second screen state node corresponding to the screen state after the change to the first screen state node in which the plurality of second screen state nodes are integrated with each other when the screen state after the change includes all the common portions shown by the information.

4. A computer-implemented testing method, comprising:

displaying a screen transition diagram, wherein the screen transition diagram includes a screen node and a screen state node, the screen node includes the screen state node, the screen node corresponds to a screen associated with a program being tested according to exploratory testing, the screen state node corresponds to a screen state of the screen in the program being tested according to exploratory testing, wherein the exploratory testing includes determining a testing content while operating the program being tested;

receiving data associated with a screen transition of the program being tested, wherein the screen transition indicates a transition of the screen state of the screen associated with n the program being tested to another screen state of the screen associated with the program, and the screen transition is caused by an interactive input to the screen associated with the program being tested;

automatically updating, based on the data associated with the screen transition, the screen state node in the screen transition diagrams;

interactively receiving an operation associated with modifying the screen node in the screen transition diagram, wherein the operation includes modifying a first association between the screen state and the screen to a second association between the screen state and another screen; and modifying, the screen state node in the screen transition diagram by modifying association between the screen state node and the screen node to another association between the screen state node to another screen node according to the operation in the screen transition diagram.

5. The computer-implemented testing method according to claim 4, wherein the automatically updating the screen state node further comprises:

adding a first screen state node corresponding to a screen of a transition destination to the screen transition diagram when a screen to be displayed transitions; and generating a second screen state node corresponding to a screen state after a change inside the first screen state node when a screen state of the screen changes according to the input of the operation.

6. The computer-implemented testing method according to claim 5, wherein the modifying the screen state node further comprises generating information showing portions common to screen states relating to a plurality of second screen state nodes when the plurality of the second screen state nodes relating to the screen states are integrated into the first screen state node, and the automatically updating the screen state node further comprises adding the second screen state node corresponding to the screen state after the change to the first screen state node in which the plurality of the second screen state nodes are integrated with each other when the screen state after the change includes all the common portions shown by the information.

7. A computer-readable non-transitory recording medium storing computer-executable program instructions that when executed by a processor cause a computer system to execute operations comprising:

displaying a screen transition diagram, wherein the screen transition diagram includes a screen node and a screen state node, the screen node includes the screen state node, the screen node corresponds to a screen associated with a program being tested according to exploratory testing, the screen state node corresponds to a screen state of the screen in the program being tested according to exploratory testing, wherein the exploratory testing includes determining a testing content while operating the program being tested;

receiving data associated with a screen transition of the program being tested, wherein the screen transition indicates a transition of the screen state of the screen associated with n the program being tested to another screen state of the screen associated with the program, and the screen transition is caused by an interactive input to the screen associated with the program being tested;

automatically updating, based on the data associated with the screen transition, the screen state node in the screen transition diagram;

interactively receiving an operation associated with modifying the screen state node in the screen transition diagram, wherein the operation includes modifying a first association between the screen state and the screen to a second association between the screen state and another screen; and modifying the screen state node in the screen transition diagram by modifying association between the screen state node and the screen node to another association between the screen state node to another screen node according to the operation in the screen transition diagram.

8. The computer-readable non-transitory recording medium according to claim 7, wherein the automatically updating the screen state node further comprises:

adding a first screen state node corresponding to a screen of a transition destination to the screen transition diagram when a screen to be displayed transitions; and generating a second screen state node corresponding to a screen state after a change of the screen inside the first node when the screen state of the screen changes according to the input of the operation.

9. The computer-readable non-transitory recording medium according to claim 8, wherein the modifying the screen state node further comprises generating information showing portions common to screen states relating to a plurality of second screen state nodes when the plurality of the second screen state nodes relating to the screen states are integrated into the first screen state node, and the automatically updating the screen state node further comprises adding the second screen state node corresponding to the screen state after the change to the first screen state node in which the plurality of the second screen state nodes are integrated with each other when the screen state after the change includes all the common portions shown by the information.

* * * * *